US006807867B2

(12) United States Patent
Brockhaus

(10) Patent No.: US 6,807,867 B2
(45) Date of Patent: Oct. 26, 2004

(54) MAGNETOINDUCTIVE FLOWMETER AND MAGNETOINDUCTIVE FLOW-MEASURING PROCESS

(75) Inventor: Helmut Brockhaus, Dinslaken (DE)

(73) Assignee: Krohne Messtechnik GmbH & Co. KG, Duisburg (DE)

( * ) Notice: Subject to any disclaimer, the term of this patent is extended or adjusted under 35 U.S.C. 154(b) by 139 days.

(21) Appl. No.: 10/116,337

(22) Filed: Apr. 4, 2002

(65) Prior Publication Data

US 2002/0145417 A1 Oct. 10, 2002

(30) Foreign Application Priority Data

Apr. 10, 2001 (DE) .......................................... 101 18 003

(51) Int. Cl.⁷ ................................................ G01F 1/58
(52) U.S. Cl. .................................................. 73/861.12
(58) Field of Search ........................ 73/861.12, 861.15, 73/861.17, 861.11, 861.08, 599

(56) References Cited

U.S. PATENT DOCUMENTS

| | | | | |
|---|---|---|---|---|
| 4,546,649 A | * | 10/1985 | Kantor ........................ 73/168 |
| 5,212,988 A | * | 5/1993 | White et al. ................... 73/599 |
| 5,325,728 A | * | 7/1994 | Zimmerman et al. ..... 73/861.12 |
| 5,625,155 A | * | 4/1997 | Yoshida .................... 73/861.11 |
| 5,677,496 A | | 10/1997 | Mochizuki |
| 5,880,376 A | * | 3/1999 | Sai et al. .................. 73/861.08 |
| 6,392,416 B1 | | 5/2002 | Keech |

* cited by examiner

Primary Examiner—Edward Lefkowitz
Assistant Examiner—Jewel Thompson
(74) Attorney, Agent, or Firm—Cesari & McKenna, LLP

(57) ABSTRACT

A magnetoinductive flowmeter incorporates a measuring tube, a magnet serving to generate a periodically alternating magnetic field that extends in a direction at least essentially perpendicular to the axis of the measuring tube, and two measuring electrodes positioned along a connecting line that extends in a direction at least essentially perpendicular to the axis of the measuring tube and to the vector of the magnetic field. An output device is provided by means of which a value for the constant-voltage component of the voltage collected at one or both of the measuring electrodes and differentiated from a reference potential is displayed to the user and/or is made available to the user for further processing. An equivalent flow-measuring process is also described.

17 Claims, 2 Drawing Sheets a)

b)

US 6,807,867 B2

MAGNETOINDUCTIVE FLOWMETER AND MAGNETOINDUCTIVE FLOW-MEASURING PROCESS

BACKGROUND OF THE INVENTION

1. Field of the Invention

This invention relates to a magnetoinductive flowmeter for moving fluids, incorporating a measuring tube, a magnet serving to generate a periodically alternating magnetic field that extends in a direction at least essentially perpendicular to the axis of the measuring tube, and two measuring electrodes positioned along a connecting line that extends in a direction at least essentially perpendicular to the axis of the measuring tube and to the vector of the magnetic field. The invention further relates to a magnetoinductive flow-measuring process for measuring the flow rate of a fluid moving through a measuring tube which is equipped with two measuring electrodes positioned along a connecting line that extends in an at least essentially perpendicular direction relative to the axis of the measuring tube, in which process a periodically alternating magnetic field is generated that extends in a direction at least essentially perpendicular to the axis of the measuring tube and perpendicular to the connecting line of the measuring electrodes, a voltage differentiated from a reference potential is collected at one or both of the measuring electrodes and the direct-current component of the voltage differentiated from the reference potential and collected at one or both of the measuring electrodes is quantified.

2. Description of the Prior Art

The basic principle of magnetoinductive flowmeters and of magnetoinductive flow-measuring techniques has been well known for some time and has been variously employed in a range of different applications. The underlying concept of a magnetoinductive flowmeter for moving fluids goes back to Faraday who in 1832 postulated the applicability of the principle of electrodynamic induction in the measurement of flow rates. According to Faraday's law of induction, a moving fluid that contains charge carriers and flows through a magnetic field will develop an electric field intensity perpendicular to the direction of flow and perpendicular to the magnetic field. A magnetoinductive flowmeter utilizes Faraday's law of induction by virtue of the fact that a magnet, usually consisting of two magnetic poles each with a field coil, generates a magnetic field perpendicular to the direction of the flow through the measuring tube. Within this magnetic field, each volume element of the fluid traveling through it and containing a certain number of charge carriers contributes its field intensity generated in that volume element to a measuring voltage that can be collected by way of measuring electrodes. In conventional magnetoinductive flowmeters, the measuring electrodes are so designed as to make conductive or capacitive contact with the moving fluid. A salient feature of magnetoinductive flowmeters is the proportionality between the measuring voltage and the flow rate of the fluid averaged across the diameter of the measuring tube, i.e. between measuring voltage and volumetric flow.

As stated above, a periodically alternating magnetic field is generated. In prior art, this has been accomplished following a variety of approaches. For example, a magnetoinductive flow measurement can be obtained using an alternating magnetic field for which purpose the field coils of the magnet are typically fed a sinusoidal 50/60 Hz line voltage directly off the power mains. However, transformation-induced noise and line interference compromise the measuring voltage derived from the flow between the measuring electrodes. Therefore, it is now common practice in magnetoinductive flow measurements to employ a polarity-reversible constant magnetic field. A polarity-reversible constant magnetic field is obtained by feeding to the field coils of the magnet a current with a sequential square-wave pattern which changes in periodically alternating fashion. Magnetoinductive flow measurements are also possible by means of a pulsed constant field which is obtainable by feeding to the field coils of the magnet a sequential square-wave current of unchanging polarity only at periodic intervals.

The magnetoinductive flowmeter and the magnetoinductive flow measuring technique referred to above have been described for instance in U.S. Pat. No. 5,677,496. According to that publication, the constant voltage component of the voltage collected on one or both of the measuring electrodes and differentiated from a reference potential is quantified for the purpose of subtracting its value from a flow-derived voltage that is composed of a value for the flow of the moving fluid through the measuring tube and a value for the said constant-voltage component. In this fashion, a voltage value is obtained which, now no longer error-prone due to the constant-voltage potential, provides a direct measure of the flow rate of the moving fluid through the measuring tube.

SUMMARY OF THE INVENTION

It is the objective of this invention to provide a magnetoinductive flowmeter and a magnetoinductive flow-measuring process, both as referred to above, which provide to the user specific information in addition to the flow rate.

Based on the concept of the magnetoinductive flowmeter described above, the magnetoinductive flowmeter according to this invention which achieves the stated objective is characterized in that it features an output device which displays a value representing the constant-current component of the voltage differentiated from the reference potential and collected at one or both of the measuring electrodes to the user, and/or makes that value available to the user for further processing.

The invention thus utilizes the fact that, apart from the magnetic-field-induced voltage, another voltage potential is generated at the measuring electrodes, that being the electrochemical noise voltage from which the user of the magnetoinductive flowmeter can derive additional, and additionally beneficial, information. These additional benefits, available to the user by virtue of this invention, are explained in detail further below in connection with the description of preferred embodiments of this invention.

The electrochemical noise voltage, utilized according to this invention, originates in contact potentials generated by the contact between the moving fluid and the measuring electrodes and resulting from the different chemical potentials of the moving fluid and the material of the measuring electrodes, respectively. Thus, according to the invention, the contact potentials which normally constitute a noise factor are utilized for providing to the user the possibility, in addition to flow-rate data, to derive quantitative information which is indicative of other parameters of the fluid, such as its conductivity or its charge-carrier concentration. In one example, a change in the electrochemical noise potential indicates a change of fluids in the measuring tube.

The above statement whereby an output device is provided for indicating a value for the constant-voltage component of the voltage collected, more specifically refers to an output which represents either the actual value of the constant-voltage component itself or a mean value for the constant-voltage component, or a value based on and derived from the constant-voltage component, such as the pH value of the fluid passing through the measuring tube.

In principle, each measuring electrode can have its own reference potential and the difference between the reference potential and the potentials of the individual measuring electrodes, the moving fluid, the measuring tube, etc. may be of any arbitrary magnitude. However, in a preferred embodiment of the invention, the reference potential employed is the earth potential. Especially when the earth potential is used as the reference potential, but in the case of other reference potentials as well, both measuring electrodes should preferably use the same reference potential. If, specifically, both measuring electrodes jointly use the earth potential as the reference potential, the structural design of the magnetoinductive flowmeter becomes quite uncomplicated and the cost associated with the evaluation of the measuring signals is correspondingly reduced.

It is entirely possible to use the voltage as differentiated from the reference potential and collected during one given cycle of the periodically alternating magnetic field for the direct quantification of the constant-voltage component. However, in a preferred embodiment of the invention, the value of the constant-voltage component differentiated from the reference potential and collected at a measuring electrode is summed and averaged over several cycles of the periodically alternating magnetic field. For unchanging flow conditions of the fluid, it will thus be possible to obtain an approximately constant value for the constant-voltage component since this approach significantly improves the signal-to-noise ratio.

Where the value of the constant-voltage component is to be determined via the two voltages collected at the measuring electrodes as differentiated from the respective reference potentials, the above-mentioned enhancement is obtained in a preferred embodiment of the invention by means of a summing device which, for the quantification of the value for the constant-voltage component in a measuring cycle, serves to determine the sum of the voltages differentiated from the reference potential and collected at the two measuring electrodes. In this connection, it is particularly desirable to additionally provide an averaging device by means of which, for the determination of the value for the constant-voltage component, the sums of the voltages differentiated from the reference potential and collected at the measuring electrodes can be averaged over several cycles of the periodically alternating magnetic field.

In a preferred design embodiment per this invention, defined conditions are obtained by additionally providing a grounding device for the moving fluid. Such a grounding device is preferably in the form of an earth electrode, earth rings and/or a pipe consisting at least in part of metal. While the same material can be used for the grounding device and for the measuring electrodes, a preferred embodiment according to this invention uses different materials for the grounding device and the measuring electrodes. This permits the utilization of effects which derive from the different contact potentials between the fluid passing through the measuring tube on the one hand, and the measuring electrodes and grounding devices made of different materials, on the other hand.

The output device of the magnetoinductive flowmeter may be in the form, for instance, of an optical display, or a bus system (field bus), or an output conductor and/or a frequency output port. Regardless of the type of output device, a preferred embodiment of this invention provides for any such output device to include a status indicator output with a threshold-value function. Thus, the output device does not, or not only, indicate a value for the constant-voltage component, but a status value from which it is evident whether or not a particular status exists. The status indicator is so designed as to capture and display a particular status as being present when the value measured exceeds or falls short of a predefined threshold value.

Another preferred embodiment of the invention incorporates a pH-calculating system by means of which, in the case of a known moving fluid and with the aid of the constant-voltage component of the voltage collected at one or both of the measuring electrodes and differentiated from the respective reference potential, the pH value of the fluid can be calculated. The pH-calculating system may be incorporated into the output device or it may equally well be a separate unit. Thus, in this preferred embodiment of the invention, the constant-voltage component of the voltage collected can be utilized for calculating the pH value, making it possible to perform an on-site calibration. The pH reading may be applied within the equipment and/or it can be retrieved at the output.

Finally, another preferred embodiment of the invention incorporates correction circuitry by means of which the value for the constant-voltage component of the voltage collected at one or both of the measuring electrodes and differentiated from the reference potential can be corrected as a function of the flow rate of the moving fluid. This takes into account that the constant-voltage component of the voltage collected depends on the flow rate of the fluid as it passes through the measuring tube. Errors otherwise introduced by this flow variable are thus largely avoided.

Based on the concept of the magnetoinductive flowmeter described above, the magnetoinductive flowmeter of this invention which achieves the stated objective is characterized in that the value determined for the constant-voltage component of the voltage collected at one or both of the measuring electrodes and differentiated from the reference potential is displayed to a user and/or made available to the user for further processing.

Preferred embodiments of the magnetoinductive flow-measuring process according to this invention are self-evident by analogous association with the above-described preferred embodiment of the magnetoinductive flowmeter according to this invention.

There are numerous specific ways in which the magnetoinductive flowmeter of this invention, and the magnetoinductive flow-measuring process according to the invention, can be designed and further enhanced. In this context, reference is made to the dependent claims and to the following detailed description of a preferred embodiment of the invention.

DETAILED DESCRIPTION OF AN ILLUSTRATIVE EMBODIMENT

Figure 1:
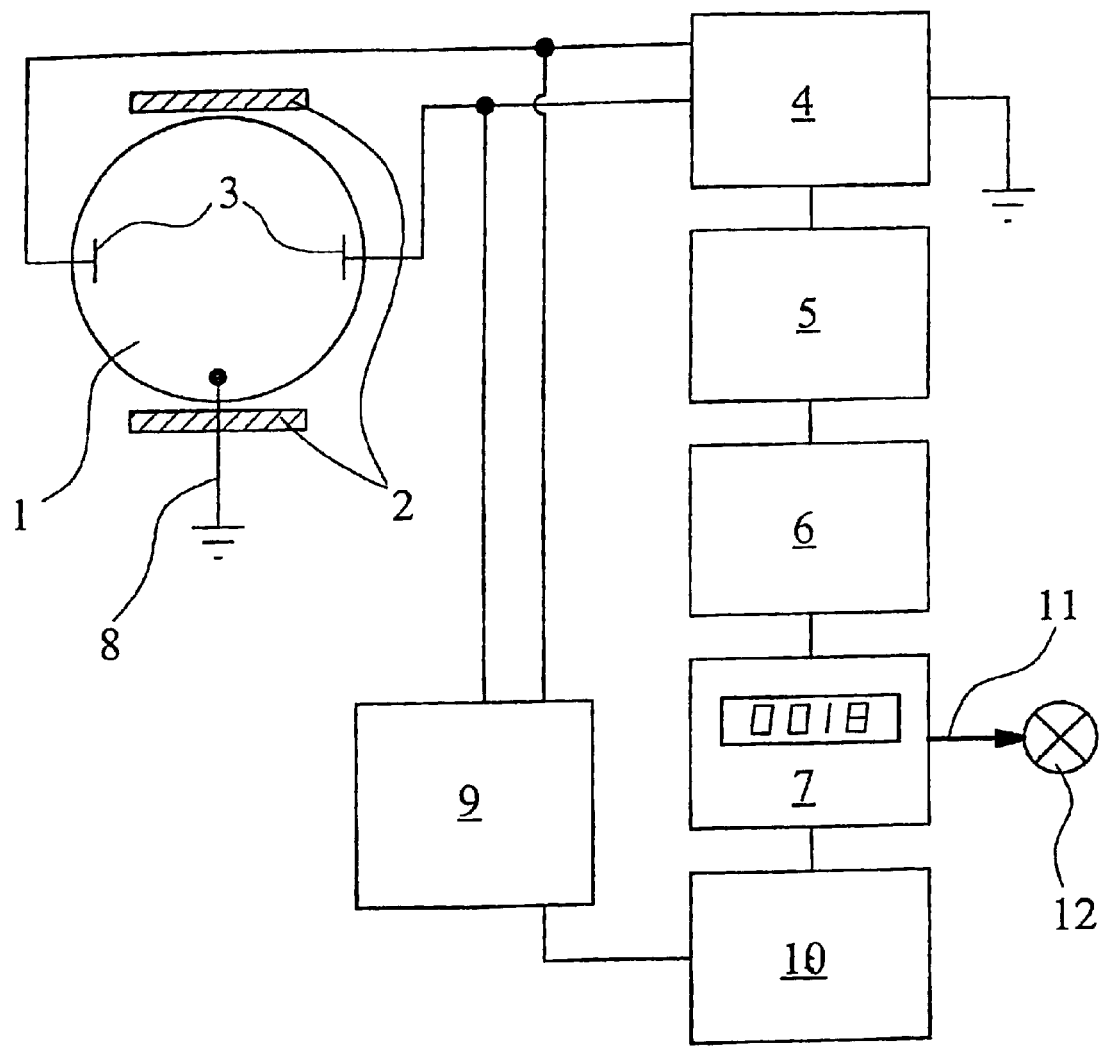
FIG. 1 is a schematic illustration of a magnetoinductive flowmeter according to a preferred embodiment of this invention.
Figure 2:
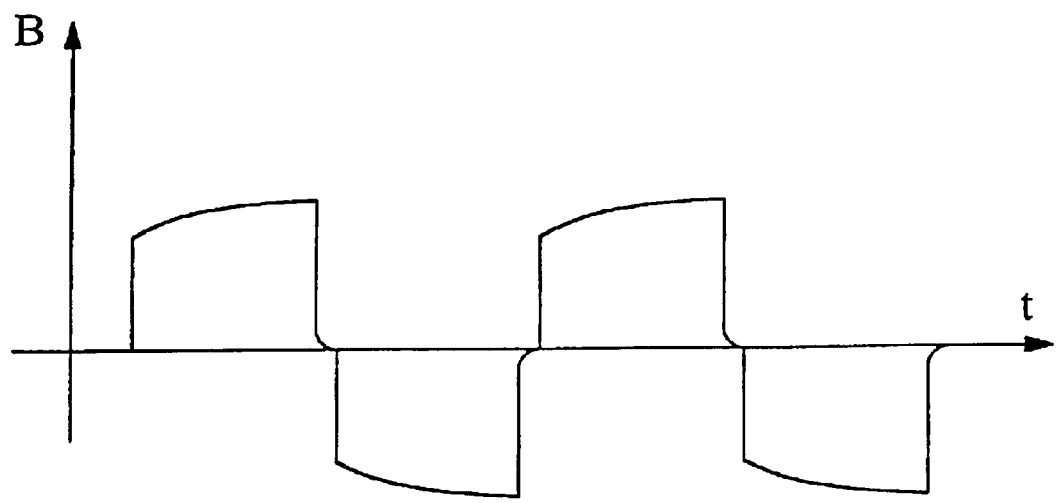
FIG. 2 is a schematic diagram of the magnetic field generated and, respectively, of the voltage collected at the measuring electrodes of the FIG. 1 flowmeter.
Figure 2:
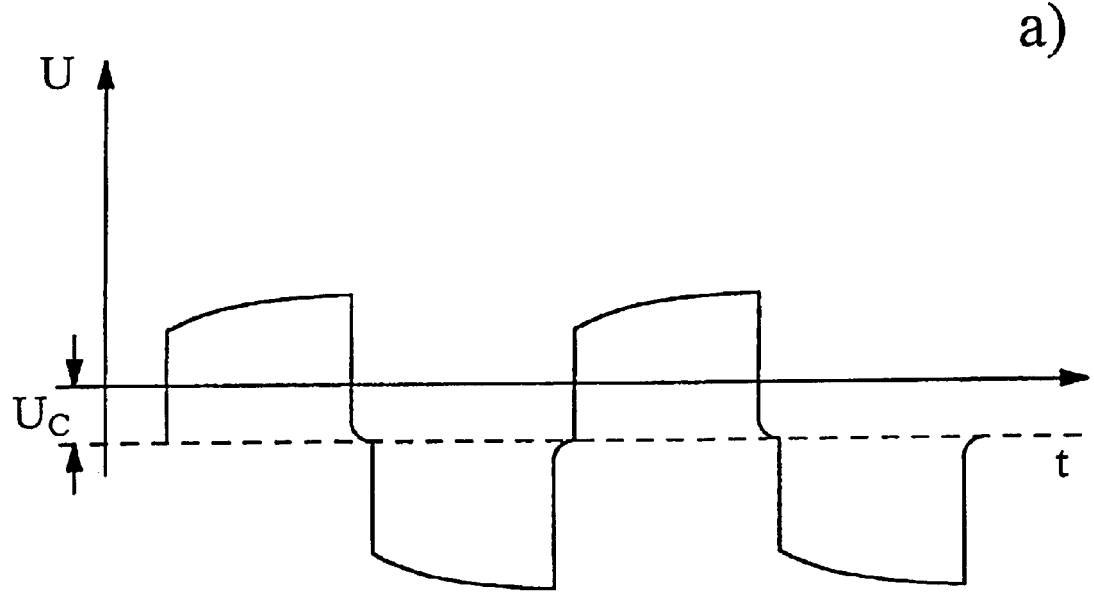

FIG. 1 is a schematic representation of the structure of a magnetoinductive flowmeter according to a preferred embodiment of the invention. The magnetoinductive flowmeter incorporates a measuring tube 1, a magnet with two field coils 2, and two measuring electrodes 3. The measuring electrodes 3 are conductively connected to the fluid flowing through the measuring tube 1. The field coils 2 generate a periodically alternating magnetic field which extends in a direction essentially perpendicular to the axis of the measuring tube. The preferred embodiment of this invention here illustrated and described employs a magnetic field which in time-controlled fashion follows an essentially rectangular or square-wave pattern and is periodically polarity-reversed as shown in FIG. 2a. The measuring electrodes are so positioned that the imaginary line between them extends in a direction perpendicular to the axis of the measuring tube and in a direction perpendicular to the vector of the periodically alternating magnetic field.

When a fluid containing charge carriers passes through the measuring tube 1, the magnetic field, when activated, induces a voltage which can be collected between the measuring electrodes 3. In equivalent fashion, the voltage is collected between either measuring electrode 3 and ground. However, the voltage collected at the measuring electrodes 3 contains not only the voltage induced by virtue of the magnetic field and the moving fluid, but also an electrochemical noise voltage produced by contact potentials between the moving fluid and the measuring electrodes 3. As can be seen in FIG. 2b, the resulting pattern of the voltage U collected at one of the measuring electrodes 3 relative to ground is symmetrical to the electrochemical noise voltage UC. The electrochemical noise is a function of the type of fluid involved, and in particular, of the fluid's conductivity and charge-carrier concentration.

As shown in FIG. 1, a measuring device 4 serves to measure the electrochemical noise voltage relative to ground. In a summing device 5 connected in series with the measuring device 4, the electrochemical noise is determined in each cycle of the periodically alternating magnetic field and thus in each cycle of the voltage collected, by summing the voltage collected at the two measuring electrodes 3 relative to the reference potential, that being the ground i.e. earth potential. The summary signal generated by the summing device 5 is passed on to an averaging device 6 which averages the summary signal as a function of time. That signal is finally fed to an output device 7 which outputs the value determined for the constant-voltage component of the voltage collected at the two measuring electrodes 3 relative to ground. In the preferred embodiment of the invention here described, the output is in the form of a direct readout of the voltage value.

The voltage value thus displayed provides to the user a measure which enables him to ascertain the conductivity of, and the charge-carrier concentration in, the fluid passing through the measuring tube 1. In particular, a change in the value displayed by the output device 7 indicates to the user of the magnetoinductive flowmeter a change in the conductivity or charge-carrier concentration of the fluid, thus permitting the detection of a change in fluids.

In the preferred embodiment of the invention here described, the fluid flowing through the measuring tube 1 is grounded by means of an earth electrode 8 provided at the bottom of the measuring tube 1. Since in this particular case, the reference potential chosen is the earth potential, the material selected for the earth electrode 8 is different from that of the measuring electrodes 3.

In the case of a defined magnetoinductive flowmeter, with an unchanging fluid moving through the measuring tube 1, the electrochemical noise voltage level is a function of the rate at which the fluid flows through the measuring tube 1. To correct for the quantified extent of the electrochemical noise that is a function of the flow rate of the fluid through the measuring tube 1, the following provisions are made: as is common practice in the case of magnetoinductive flowmeters, the voltage induced between the measuring electrodes 3 is used for determining the rate at which the fluid flows through the measuring tube 1. This basic flow-rate measurement takes place in a flow-measuring device 9. The flow-measuring device 9 permits the output of the value determined for the flow rate of the fluid through the measuring tube 1 by means of a visual display or via a bus system. Additionally, in the preferred embodiment of the invention here described, that flow-rate value is fed to a correction device 10 which on its part is connected to the output device 7 and which corrects the value delivered by the output device 7, representing the constant-voltage component of the voltage collected as a function of the flow rate of the fluid through the measuring tube 1.

Finally, the output device 7 includes a status output port 11 which features a threshold-value function. In the preferred embodiment of the invention here described, the user of the magnetoinductive flowmeter can preset the threshold value for instance in such fashion that in the event of a deviation of the value delivered by the output device 7 for the constant-current component of the voltage collected from a predefined point, a signaling device such as a lamp 12 is activated. Activation of the lamp 12 gives the user a clear indication to the effect that the system has detected a change in fluids in the measuring tube 1 by virtue of a changed charge-carrier concentration in the moving fluid. In the example shown, the threshold-value function defines a window with an upper threshold value and a lower threshold value. As long as the value of the constant-voltage component of the voltage collected remains within that window, it indicates that the fluid passing through the measuring tube 1 is unchanged. If, on the other hand, the upper threshold value is exceeded or the lower threshold value is not reached, it signals that the value of the constant-voltage component of the voltage collected has changed beyond the error limit, activating the lamp 12 as an indication of a change of fluids.

I claim:

1. A magnetoinductive flow-measuring process for measuring the flow rate of a fluid, comprising the following steps:

providing a measuring tube having a longitudinal axis through which the fluid moves and which is equipped with two measuring electrodes positioned along an imaginary connecting line that extends substantially perpendicular to the axis of the measuring tube;

generating a periodically alternating magnetic field extending in a direction substantially perpendicular to the axis of the measuring tube and perpendicular to said imaginary connecting line;

collecting a voltage differentiated from a reference potential at one or both of the measuring electrodes in each cycle of the periodically alternating magnetic field;

determining an electrochemical noise voltage by summing the voltage collected at one or both of the two measuring electrodes relative to the reference potential and averaging the summary signal as a function of time, and displaying the electrochemical noise voltage to a user and/or providing the electrochemical noise voltage to the user for further processing.

2. A magnetoinductive flow-measuring process as in claim 1, including the additional step of holding the reference potential at earth potential.

3. The magnetoinductive flow-measuring process as in claim 1 or 2, including the additional step of using the same reference potential for both measuring electrodes.

4. The magnetoinductive flow-measuring process as in claim 1 or 2, including the additional step of using a material for the reference electrode, which is different from the material for the measuring electrodes.

5. Magnetoinductive flow-measuring process as in claim 1 or 2, including the additional step of displaying the electrochemical noise voltage via a status output port featuring a threshold-value function.

6. The magnetoinductive flow-measuring process as in claim 5, including the additional step of indicating a change in fluids via the status output port.

7. The magnetoinductive flow-measuring process as in claim 1 or 2, including the additional steps of:
   calculating the pH value of the flowing fluid with the aid of the electrochemical noise voltage, and
   displaying the pH value to the user.

8. The magnetoinductive flow-measuring process as in claim 1 or 2, including the additional steps of:
   determining the flow rate of the moving fluid, and
   correcting the value for the electrochemical noise voltage as a function of the determined flow rate of the moving fluid.

9. A magnetoinductive flow-measuring process for measuring the flow rate of a fluid, comprising the following steps:
   providing a measuring tube having a longitudinal axis through which the fluid moves and which is equipped with two measuring electrodes positioned along an imaginary connecting line that extends substantially perpendicular to the axis of the measuring tube;
   generating a first magnetic field extending in a first direction substantially perpendicular to the axis of the measuring tube and perpendicular to said imaginary connecting line;
   collecting a first voltage differentiated from a reference potential at one or both of the measuring electrodes;
   generating a second magnetic field extending in a second direction which is diametrically opposed to the first direction, the absolute value of the second magnetic field being the same as the absolute value of the first magnetic field;
   collecting a second voltage differentiated from said reference potential at one or both of the measuring electrodes;
   determining an electrochemical noise voltage by summing the first voltage and the second voltage collected at one or both of the two measuring electrodes relative to the reference potential during the first magnetic field and the second magnetic field, respectively, and averaging the summary signal as a function of time, and
   displaying the electrochemical noise voltage to a user and/or providing the electrochemical noise voltage to the user for further processing.

10. The magnetoinductive flow-measuring process as in claim 9, wherein the steps of
   generating a first magnetic field extending in a first direction substantially perpendicular to the axis of the measuring tube and perpendicular to said imaginary connecting line;
   collecting a first voltage differentiated from a reference potential at one or both of the measuring electrodes;
   generating a second magnetic field extending in a second direction which is diametrically opposed to the first direction, the absolute value of the second magnetic field being same as the absolute value of the first magnetic field;
   collecting a second voltage differentiated from a reference potential at one or both of the measuring electrodes, and
   determining an electrochemical noise voltage by summing the first voltage and the second voltage collected at one or both of the two measuring electrodes relative to the reference potential during the first magnetic field and the second magnetic field, respectively, and averaging the summary signal as a function of time, are repeated.

11. The magnetoinductive flow-measuring process as in claim 9 or 10, including the additional step of holding the reference potential at earth potential.

12. The magnetoinductive flow-measuring process as in claim 9 or 10, including the additional step of using the same reference potential for both measuring electrodes.

13. The magnetoinductive flow-measuring process as in claim 9 or 10, including the additional step of using a material for the reference electrode, which is different from the material for the measuring electrodes.

14. Magnetoinductive flow-measuring process as in claim 9 or 10, including the additional step of displaying the electrochemical noise voltage via a status output port featuring a threshold-value function.

15. The magnetoinductive flow-measuring process as in claim 14, including the additional step of indicating a change in fluids via the status output port.

16. The magnetoinductive flow-measuring process as in claim 9 or 10, including the additional steps of:
   calculating the pH value of the flowing fluid with the aid of the electrochemical noise voltage, and
   displaying the pH value to the user.

17. The magnetoinductive flow-measuring process as in claim 9 or 10, including the additional steps of:
   determining the flow rate of the moving fluid, and
   correcting the value for the electrochemical noise voltage as a function of the determined flow rate of the moving fluid.

* * * * *